Oct. 5, 1948.  J. W. LOY  2,450,804
CATALYST CHAMBER CONSTRUCTION
Filed Dec. 9, 1943  2 Sheets-Sheet 1

INVENTOR
J. W. LOY
BY Hudson, Young & Yuiger
ATTORNEYS

Oct. 5, 1948.                    J. W. LOY                    2,450,804
                       CATALYST CHAMBER CONSTRUCTION
Filed Dec. 9, 1943                                          2 Sheets-Sheet 2

INVENTOR
J. W. LOY
BY Hudson, Young & Krieger
ATTORNEYS

Patented Oct. 5, 1948

2,450,804

UNITED STATES PATENT OFFICE 2,450,804

CATALYST CHAMBER CONSTRUCTION

John W. Loy, McLean, Va., assignor to Phillips Petroleum Company, a corporation of Delaware Application December 9, 1943, Serial No. 513,593

5 Claims. (Cl. 23—288)

This invention relates to catalyst chambers of the class generally employed in carrying out hydrocarbon conversions in the presence of substantially fixed masses of solid catalytic material. More particularly, the instant invention pertains to a catalyst chamber of the character indicated, including an improved arrangement of containers for spaced beds of solid catalyst and apparatus for properly distributing fluid intermediate pairs of next adjacent beds of catalyst material in the course of the catalytic conversion of hydrocarbons within the chamber and/or in the course of reactivating the catalytic material when the same has become more or less contaminated by the deposition thereon of carbonaceous material as a result of the conversion of hydrocarbons, to thereby obtain effective heat control within the chamber.

Catalyst chambers are of particular utility in the catalytic conversion of hydrocarbon oils, especially in the cracking of said oils, to facilitate direct heat transfer and temperature control within the catalyst mass. Thus, in the catalytic cracking of hydrocarbon oil it is usually desirable to supply heat to vapors of said oil undergoing treatment during the conversion period in the event that the conversion is endothermic, and to remove heat developed in the course of the exothermic reactivation of the catalyst by combustion of the carbon deposited thereon. There are instances wherein the hydrocarbon conversion may be exothermic in character and in such cases, care must be taken to remove undesirable heat by supplying suitable heat absorbing fluids to the vapors of the hydrocarbons being treated.

Numerous advances in the art of cracking hydrocarbons in the presence of suitable solid catalyst, and the subsequent reactivation of spent catalyst, have been made in recent years. These advances have included among other things particular arrangements of beds of solid catalyst material within a chamber and the provision of means for distributing fluid under pressure into or between successive beds of catalyst in order to control the temperature of the reaction taking place. Certain present day types of catalyst chamber construction contemplate the employment of a vertical tubular catalyst chamber having a plurality of vertically spaced beds of solid catalyst supported on suitable gratings to permit the flow of fluid through successive catalyst beds but to prevent the passage of solid catalyst material therethrough. Each of these beds is disposed horizontally across the interior of the chamber and is substantially coextensive with the internal diameter of the chamber. Fluid mediums for supplying necessary heat to the reaction when the same is endothermic in character, and for removing heat when the reaction is exothermic are introduced into the space between adjacent beds. The particular arrangement outlined above has been generally satisfactory in accomplishing its intended functions.

The present invention constitutes a substantial improvement over the art as it contemplates a number of additional worthwhile advances by virtue of the particular arrangement of catalyst beds and the means for transmitting fluid mediums for controlling the temperature within the chamber, as will be readily apparent to persons skilled in the art. Among other things, the flow of unconverted hydrocarbons between individual catalyst beds and the chamber wall is fully eliminated. Additionally, the channeling of unconverted hydrocarbon fluids either through the chamber insulation or through openings within the catalyst itself is eliminated. Moreover, it is found that the pressure drop in the fluid across catalyst beds in the direction of fluid flow is relatively small as compared to the corresponding pressure drops when employing present day catalytic reactors.

The transmission of fluid diluent or reactant between successive beds of catalysts as taught by the present invention presents a still further advantage. With the catalyst beds arranged as herein disclosed, the contact area normal to fluid flow increases with each successive bed starting from the center and progressing outwardly. This creates a somewhat greater pressure drop per inch of the bed in the first few inches of the catalyst bed than where other bed arrangements are employed. The addition of fluid diluent or reactant, thus increasing the total volume of fluid after the major portion of the pressure drop has occurred, represents the optimum condition for minimum pressure drop within a system of this nature. Furthermore, the pressure necessary to inject a diluent or reactant into the system will be less than in the case of the vertically spaced horizontal types of catalyst bed arrangements. The flow of fluid through the first catalyst bed is greater per unit of area of the bed than in the next succeeding beds. This results in a shorter contact period between the reactants and the catalyst at a time when the reaction has a tendency to proceed at its maximum rate according to the law of mass action. Slower rates of flow per unit area in the successive beds occur when the rate of reaction has decreased and a longer contact time is found desirable.

The present invention has for its primary object the provision of an improved arrangement of beds of solid catalyst material whereby proper conversion of hydrocarbon fluid and subsequent reactivation of contaminated catalyst may be readily obtained.

Another object of this invention resides in the provision of apparatus of the character indicated for more effectively carrying out a hydrocarbon conversion reaction and then regenerating a catalyst in situ.

These, as well as other objects and advantages, will be readily comprehended by persons skilled in the art by reference to the following detailed description and annexed drawings which respectively describe and illustrate a preferred embodiment of invention, and wherein, Figure 1 is an elevational view of the catalyst chamber of this invention with necessary lines for introducing and withdrawing fluid materal employed therewith in carrying out a hydrocarbon conversion reaction or in regenerating contaminated catalyst material in the manner outlined above;

Figure 1:
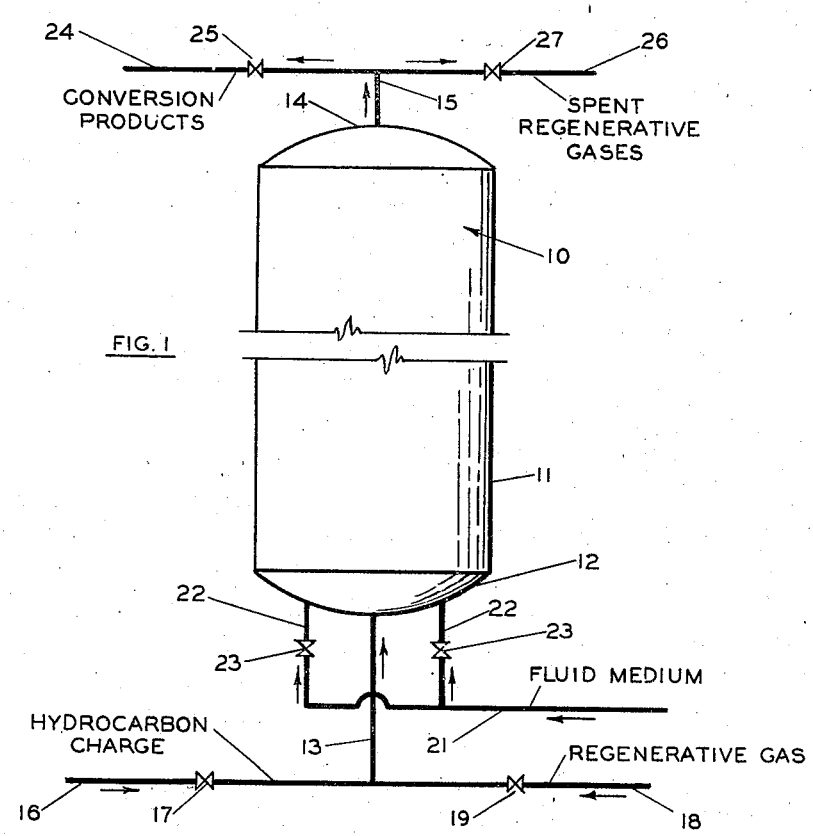

Referring first to Figure 1 of the drawing, I have generally denoted a catalyst chamber 10 including a cylindrical vertical wall 11, a bottom wall 12 having a fluid inlet 13 and a top wall 14 having a fluid outlet 15. A line 16 delivers a stream of hydrocarbon feed stock to inlet 13 as allowed by a valve 17, when the apparatus is employed in the conversion portion of a complete cycle. A line 18 delivers regenerative gases to inlet 13 as allowed by a valve 19 when the apparatus is employed in the regenerative portion of a complete cycle. A line 21 transmits a suitable fluid temperature control medium into individual inlets 22, of corresponding fluid distribution mechanisms to be described in detail further along, as allowed by valves 23. Hydrocarbon conversion products and spent regenerative gases are both discharged from chamber 10 by way of outlet 15 and are respectively delivered into a line 24 having a control valve 25 and a line 26 having a control valve 27

Figure 3:
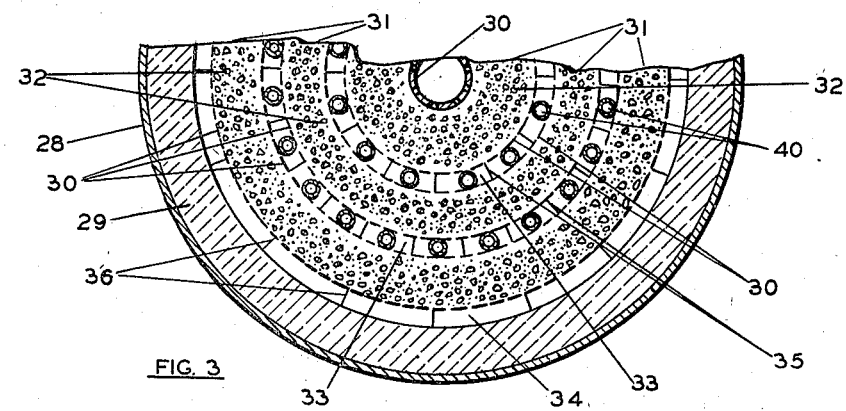
Figure 3 is a horizontal cross-section view taken through line 3—3 of Figure 2; and, Figure 4 is a perspective view of part of one of the fluid distribution means of this inventon.
Figure 2:
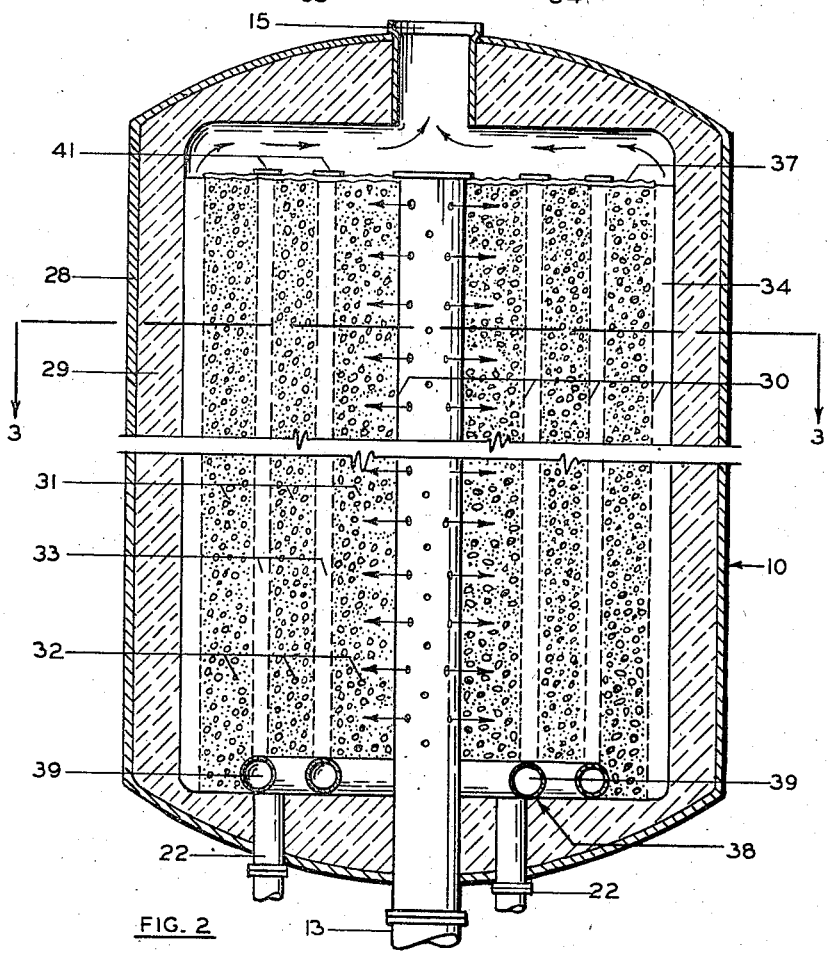
Figure 2 is an enlarged central elevational view of the catalyst chamber and the contents thereof illustrated in Figure 1.

Turning next to Figures 2 and 3 of the drawing, attention is directed to the fact that the outer walls of chamber 10 are preferably fabricated from plate or sheet metal 28 of requisite composition and thickness while the inner walls thereof are composed of a suitable sheath of refractory insulation 29, such as the well known insulag or insulcrete. A plurality of substantially concentric spaced perforate cylindrical conduits or members 30 are disposed substantially coaxially within chamber 10 and are arranged to form a plurality of alternate annular compartments 31, for containing beds of solid catalyst material 32, and annular spaces 33, respectively. It will be noted that innermost cylindrical member 30 communicates directly with inlet 13 and that outermost cylindrical member 30 is spaced from the inner surface of chamber 10 to form an annular passage 34 therewith that communicates with outlet 15. A plurality of spaced partitions or separators 35 may be positioned in or across annular spaces 33 to maintain adjacent cylindrical members 30 in predetermined spaced relationship and/or to divide annular spaces 33 into a plurality of passages. A plurality of similar spaced partitions or separators 36 in annular passage 34 are recommended. A closure 37 extends across the upper ends of perforate cylindrical members 30. Said closure 37 is preferably corrugated in construction in order to permit the expansion or contraction thereof as occasioned by temperature changes within the chamber.

Figure 4:
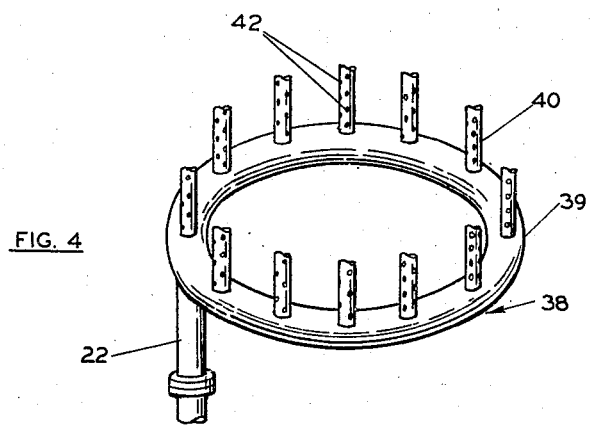

With reference to Figure 4 of the drawing, I have illustrated therein a preferred and recommended type of fluid distribution mechanism 38 that may be advantageously employed in the practice of my invention. The fluid distribution mechanisms each include an inlet 22, referred to above, an annular header or manifold 39 communicating with said inlet 22, and a plurality of upwardly extending branch lines or conduits 40 disposed within annular spaces 33. The lower end of each branch line 40 communicates with header 39 and the upper end thereof is closed by a cap 41 or in any other manner well known to the art. Each branch line 40 is provided with a plurality of ducts 42 establishing communication between the interior and exterior thereof. As will be observed from an inspection of Figures 2 and 3, headers 39 are concentrically arranged and the corresponding branch lines 40 extend into corresponding annular spaces 33.

While the catalyst beds and fluid distribution mechanisms are illustrated as being supported on the bottom wall of chamber 10, it will be apparent that the chamber and the contents thereof may be inverted, disposed horizontally, or tilted to any other desired position.

In outlining the operation of my present invention, let us first assume that the apparatus illustrated and described is employed in carrying out an endothermic hydrocarbon conversion process in the presence of suitable solid catalyst material 32. A stream of fluid hydrocarbon feed stock is introduced by way of line 16 and inlet 13 directly into innermost perforate cylindrical member 30 whence it flows radially through the perforations therein and thence through the successive beds of catalyst material and annular spaces 33. A suitable fluid medium for controlling the temperature of the reaction taking place within the chamber 10 is introduced into each fluid distribution mechanism 38 by way of line 21 and inlets 22, whence it flows through header 39, branch lines 40 and ducts 42 into corresponding annular spaces 33. The fluid heat control medium so injected into annular spaces 33 commingles with the hydrocarbon fluid undergoing conversion and supplies necessary heat thereto to assist in the reaction. Converted hydrocarbons pass upwardly through annular passage 34 or through the passages formed across said annular passage by partitions 36, when the same are employed, and are then discharged from chamber 10 through outlet 15 and line 24. It will be obvious that during such a procedure, valves 17, 23 and 25 are all open, while valves 19 and 27 are closed.

When the apparatus of my invention is employed in regenerating spent solid catalyst material to burn off carbon deposited thereon in the course of the conversion procedure outlined above, valves 17 and 25 are closed and valves 19 and 27 are open. A suitable free-oxygen containing regenerative gas is introduced into inlet 13 and is transmitted centrally into innermost perforate cylindrical member 33, whence it is discharged radially and outwardly through successive beds of catalyst. Since the reactivation of a spent catalyst is generally exothermic, a fluid heat control medium for maintaining the temperature within chamber 10 below a predetermined maximum is introduced and injected into the chamber by way of line 21 and the fluid distribution mechanisms 38.

From the foregoing, it is believed that the construction, operation, and advantages of my present invention will be readily comprehended by persons skilled in the art. It is to be clearly understood, however, that various changes in the apparatus set forth above may be made without departing from the scope of the invention, it being intended that all matter contained in the description or shown in the drawing shall be interpreted as illustrative only and not in a limiting sense.

I claim:

1. Catalytic apparatus for the conversion of fluids comprising a catalyst chamber, a plurality of foraminate concentric partitions in said chamber adapted to permit the arrangement of a plurality of concentric annular catalyst beds extending longitudinally within said chamber and spaced from each other and from the walls of the chamber, a perforate inlet conduit extending along the longitudinal axis within said chamber and coaxial with said concentric catalyst beds, means for introducing fluid to be converted into said inlet conduit whereby said fluid flows through the perforation therein and thence through each of said concentric catalyst beds transversely to the longitudinal axis thereof and into the space between the outermost catalyst bed and the chamber wall, means for introducing a fluid medium directly into the spaces between catalyst beds at a plurality of points spaced along the longitudinal axis of said spaces whereby said medium becomes admixed with fluid flowing transversely through said beds, means for regulating the flow of said fluid medium into said spaces whereby the temperature, pressure drop and contact time may be regulated in each of said catalyst beds, and means for recovering converted fluid admixed with said fluid medium from the space surrounding the outermost catalyst bed.

2. Catalytic apparatus for the conversion of fluids comprising a catalyst chamber, a plurality of foraminate concentric partitions in said chamber adapted to permit the arrangement of a plurality of concentric annular catalyst beds extending longitudinally within said chamber and spaced from each other and from the walls of the chamber, a perforate inlet conduit extending along the longitudinal axis within said chamber and coaxial with said concentric catalyst beds, means for introducing fluid to be converted into said inlet conduit whereby said fluid flows through the perforations therein and thence through each of said concentric catalyst beds transversely to the longitudinal axis thereof and into the space between the outermost catalyst bed and the chamber wall, a plurality of tubular perforate members extending longitudinally into each of said spaces between the catalyst beds, means for introducing a fluid medium into said perforate members and thence into said spaces in which said fluid medium becomes admixed with fluid flowing transversely through said beds, means for regulating the flow of said fluid medium into said spaces whereby the temperature, pressure drop and contact time may be regulated in each of said catalyst beds, and means for recovering converted fluid admixed with said fluid medium from the space surrounding the outermost catalyst bed.

3. The apparatus according to claim 2 and including a fluid header comprising a plurality of annular tubular members, the perforate tubular members located in respective spaces being connected to corresponding annular members.

4. Catalytic apparatus for the conversion of fluids comprising a catalyst chamber, a plurality of foraminate concentric partitions in said chamber adapted to permit the arrangement of a plurality of concentric annular catalyst beds extending longitudinally within said chamber and spaced from each other and from the walls of the chamber, a perforate inlet conduit extending along the longitudinal axis within said chamber and coaxial with said concentric catalyst beds, means for introducing fluid to be converted into said inlet conduit whereby said fluid flows through the perforations therein and thence through each of said concentric catalyst beds transversely to the longitudinal axis thereof and into the space between the outermost catalyst bed and the chamber wall, a plurality of spaced imperforate partitions disposed within said spaces between the catalyst beds and defining a plurality of passages therebetween, perforate tubular members disposed within said passages, means for introducing fluid heat control medium into said perforate members and thence directly into said passages in which said fluid medium becomes admixed with fluid flowing transversely through said beds, means for regulating the flow of said fluid medium into said spaces whereby the temperature, pressure drop and contact time may be regulated in each of said catalyst beds, and means for recovering fluid mixture from the space surrounding the outermost catalyst bed.

5. Apparatus according to claim 4 and including a plurality of said imperforate partitions in the outer space between the outermost catalyst bed and the inner chamber wall.

JOHN W. LOY.

REFERENCES CITED

The following references are of record in the file of this patent:

UNITED STATES PATENTS

| Number | Name | Date |
|---|---|---|
| 2,163,599 | Houdry | June 27, 1939 |
| 2,251,571 | Howard | Aug. 5, 1941 |
| 2,276,307 | Houdry | Mar. 17, 1942 |